United States Patent [19]
Ball

[11] 3,737,027
[45] June 5, 1973

[54] COMPOSITE CARTRIDGE PACK FOR HARDENING RESINS

[75] Inventor: Malcolm James Ball, Troon, Scotland

[73] Assignee: Imperial Chemical Industries Limited, London, England

[22] Filed: Aug. 16, 1971

[21] Appl. No.: 172,114

[30] Foreign Application Priority Data
Sept. 1, 1970 Great Britain..................41,733/70

[52] U.S. Cl. ...............206/47 A, 52/309, 61/45 B
[51] Int. Cl. .........................................B65d 81/32
[58] Field of Search.............206/47 A, 46 F, 84, 206/46 R, 45, 33; 61/45 B; 52/309

[56] References Cited
UNITED STATES PATENTS
3,308,936  3/1967  Roland et al..................206/46 F
3,497,131  2/1970  Tracy..........................206/46 F
3,667,594  6/1972  Herrell........................206/45
3,468,413  9/1969  McMillan......................206/46 R FOREIGN PATENTS OR APPLICATIONS
1,423,023  11/1965  France........................206/47 A
1,137,005  1/1957   France........................206/47 A Primary Examiner—William T. Dixson, Jr.
Attorney—Cushman, Darby & Cushman

[57] ABSTRACT

A composite pack for a two-component hardening resin comprises two flexible frangible containers, one within the other, each end of the inner container being within an end of the outer and the ends being closed by a compression closure member, one container containing the resin and the other a resin hardener.

12 Claims, 3 Drawing Figures

COMPOSITE CARTRIDGE PACK FOR HARDENING RESINS

This invention relates to a composite two component cartridge pack of resin and resin hardener for stabilizing and reinforcing rock formations and for securing elements in boreholes. The invention also includes a method of making the cartridge pack.

The use of hardening resins for securing elements such as anchor bolts in boreholes is well known and has become common practice for securing roof bolts in mines. In this method a resin composition and a hardener therefor are introduced into the borehole as at least two separate components in frangible containers and the element to be fixed in the borehole is rotated or vibrated as it is inserted in the borehole to break the containers and mix the components. The resin subsequently hardens to secure the element in position. The method has been generally described, for example, in British Pat. Specifications Nos. 998,240 and 1,160,123.

The resins used comprise, for example, polyester, epoxy and polyurethane resins. The resin component generally contains the resin, a resin cross-linking substance, for example styrene, and inert filler. The hardener component usually contains a polymerization catalyst, for example, peroxides of organic acids, to promote the cross-linking reaction and it may also contain fillers and other modifiers.

For example, the hardener may contain flame retardants such as chlorinated paraffins. It is usually considered advantageous for the hardener to be distributed along the resin component and composite packs have been proposed wherein the hardener has been contained in an annular layer around the resin component or in an elongated frangible container entirely within the resin container. These packs have been rather difficult to make in a form which would ensure positive relative positioning of the components, rupturing of the component containers and uniform mixing of the components on insertion of the element into the borehole.

It is an object of this invention to provide a readily made composite cartridge pack of hardening resins wherein the relative longitudinal positioning of hardener and resin is maintained and rupturing and uniform mixing in the borehole is facilitated.

In accordance with the invention a composite two component cartridge pack of hardening resin comprises two tubular, flexible, frangible containers disposed one within the other, each end of the inner container being within an end of the outer container, the ends of both containers being crimped and sealed by a compression closure member, one member embracing each end of the outer container, one container containing a resin and the other container containing a hardener for the resin. Whilst the resin and hardener may be in either of the containers, the hardener is usually the smaller component and it is generally more convenient for the hardener to be in the inner container with the resin in the space between the containers.

The containers are conveniently made from synthetic plastics film, for example films of polyethylene, polypropylene, polyvinyl chloride or polyethyleneterephthalate. Films in the form of 'lay flat' tubing are especially convenient. The compression closure member is conveniently a tying device, for example tying wire, tape, string or a compressible metal clip.

The invention also includes a method of making the composite cartridge pack, which method comprises feeding an end portion of an inner tubular, flexible, frangible container containing a first component of a hardening resin through an outer tubular, flexible, frangible container, crimping the ends of the container and applying a compression closure member over the crimped end of the outer container to seal both containers, introducing a second component of the said hardening resin into the space between the containers, crimping the containers to enclose the said second component within the outer container, and applying a second compression closure member around the crimped portion of the outer container to seal both containers and cutting the containers transversely beyond the second closure member to separate the thus formed composite cartridge pack from the adjacent portions of the flexible containers.

The second resin component may advantageously be fed into the outer container by extruding it through a nozzle. The filling operation may be speeded up by first 'shirring' a long outer tubular container over the nozzle and simultaneously feeding one resin component through the nozzle and feeding the inner container along the outside of the nozzle. Conveniently, at appropriate invervals, two closure members slightly spaced apart are applied around the crimped portion of the outer container and the containers are divided by cutting between the closure members. In this method the extrusion pressure advances the outer container and the drag of the end closure member on the inner container simultaneously advances the inner container.

The inner container is also advantageously filled by extruding the first component into it and long lengths may be filled by 'shirring' the tubular container over an extrusion nozzle. It is advantageous to fill both containers simultaneously using two adjacent extrusion machines. The filling operation may, if desired, be made completely continuous by making the tubular containers from longitudinally folded tape which is continuously folded around the extrusion nozzles and side seamed immediately before filling.

The invention is further illustrated by the following description of the production of a preferred cartridge pack, which is described by way of example only with reference to the accompanying drawings wherein FIG. 1 is a longitudinal section of a cartridge pack;

Figure 1:
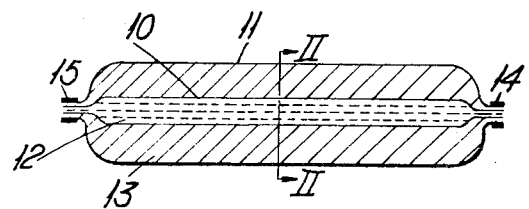
Figure 2:
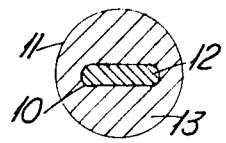
FIG. 2 is a cross-section of the pack of FIG. 1 on the line II—II.

The cartridge pack of FIG. 1 has an inner tubular container 10 of lay-flat synthetic plastics film inside an outer tubular container 11 also of synthetic plastics film. The container 10 contains a resin hardener 12 and a resin composition 13 is contained in container 11. The ends of the containers are compressed and closed by metal clips 14, each end of container 10 being firmly held within an end of container 11. The container 10 as shown in FIG. 1 is co-axial with container 11 but it will be apparent that, because of the flexibility of the containers, there will be relative movement of the inner and outer containers and the inner container will usually only occupy this position when the ends of the outer container are urged apart.

Figure 3:
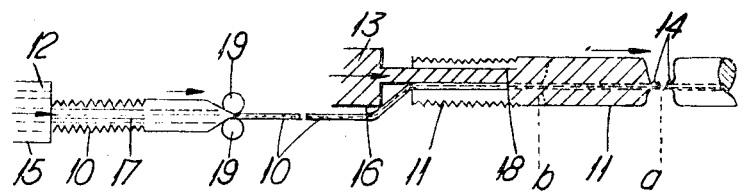
FIG. 3 is a flow diagram showing the making of the pack of FIG. 1.

In manufacturing the cartridge pack two extruders 15 and 16, arranged as shown in FIG. 3, are used to extrude hardener 12 and resin composition 13 respectively. A length of tubular container 10 is shirred over the nozzle 17 of extruder 15 and hardener is extruded into it. Similarly a length of tubular container 11 is shirred over the nozzle 18 of extruder 16 and resin composition 13 is fed into it. The filled length of container 10 is fed through the nip of a pair of rolls 19, the nip of the rolls being adjustable to permit variation of the amount of hardener per unit length and is then fed through the space between the container 11 and nozzle 18 and through the end of container 11. A metal clip 14 is compressed on the end of container 11 so as to close container 11 and an end portion of container 10 within container 11. As resin composition is extruded into container 11, both containers are advanced. At an appropriate stage the filled portion of the container 11 is constricted as illustrated at positions a and b and two metal clips 14 are applied side by side to the constricted portion. The containers are then severed between the clips 14 as shown at position a.

The following Example further illustrates the practice of the invention.

EXAMPLE

The cartridge pack of this Example contained 450 g. of resin composition in an outer polythene tubular container, 34 cm. long, 30 mm. diameter having a wall thickness of 0.025 mm., and 30 g. of hardener composition in a flattened inner polythene tubular container 34 cm. long, 18 mm. diameter having a wall thickness of 0.025 mm. The ends were closed by a U-clip bent inwards at both ends to embrace the container ends. For filling the containers 46 cm. long extruder nozzles were used, the nozzle 17 being 7 mm. outside diameter and nozzle 18 being 14 mm. outside diameter. It was convenient to load 17 meter lengths of the containers 10 and 11 over the nozzles before commencing a filling operation and this was sufficient for 45 to 50 cartridges.

The resin composition contained

| | Parts by weight |
|---|---|
| Leguval K25R resin | 40 |
| Ground dolomite filler | 36 |
| Chlorinated paraffin wax (fire retardant) | 4 |

The Leguval K25R (Registered Trade Mark) resin used is an unsaturated polyester type resin commercially available from Farbenfabriken Bayer AG. It contained a mixture of maleic acid and adipic acid esterified with a dihydric alcohol such as ethylene glycol and styrene as the cross-linking agent.

The hardener composition contained

| | Parts by weight |
|---|---|
| Benzoyl peroxide | 26.0 |
| Dimethyl phthalate (plasticiser) | 17.5 |
| Chlorinated paraffin was | 21.7 |
| China clay | 17.4 |
| Ground dolomite | 17.4 |

A resin cartridge pack of this Example was placed in a closed end of a rigid tube of transparent acrylic plastics material having an internal diameter of 35 mm. A 30 mm. diameter wooden rod rotated at 350 rpm was advanced through the cartridge until the rod reached the closed end of the tube. The polythene containers of the cartridge were shredded into small fragments and the hardener and resin compositions were thoroughly mixed. The resin set hard in a few minutes, sealing the rod into the acrylic tube over a length of 60 cm. without leaving any uncured portions of resin.

Further cartridge packs were tested in holes drilled in coal and rock in mines and metal bolts were successfully secured in the holes.

What we claim is:

1. A composite two component cartridge pack of hardening resins comprising two tubular, flexible, frangible containers disposed one within the other, each end of the inner container being within an end of the outer container, the ends of both containers being crimped and sealed by encircling compression closure members, one member embracing each end of the outer container so as to seal an end of each container, the outer container containing a resin and the inner container containing a hardener for the resin.

2. A pack as claimed in claim 1 wherein the containers are made from synthetic plastics film.

3. A pack as claimed in claim 2 wherein the containers are made from films of polethylene, polypropylene, polyvinyl chloride or polyethyleneterephthalate.

4. A pack as claimed in claim 1 wherein the compression closure member comprises tying wire, tape, string or a compressible metal clip.

5. A method of making a composite cartridge pack of hardening resin which comprises feeding an end portion of an inner tubular, flexible, frangible container containing a first component of a hardening resin through an outer tubular, flexible, frangible container, crimping the ends of the containers and applying a compression closure member over the crimped end of the outer container to seal both containers, introducing a second component of the said hardening resin into the space between the containers, crimping the containers to enclose the said second component within the outer container and applying a second compression closure member around the crimped portion of the outer container to seal both containers and cutting the containers transversely beyond the second closure member to separate the thus formed composite cartridge pack from the adjacent portions of the flexible containers.

6. A method as claimed in claim 5 wherein the second resin component is fed into the outer container by extruding it through a nozzle.

7. A method as claimed in claim 5 wherein the outer tubular container is 'shirred' over the nozzle, one resin component is fed through the nozzle and the inner container is simultaneously fed along the outside of the nozzle.

8. A method as claimed in claim 7 wherein, at appropriate intervals, two closure members slightly spaced apart are applied around the crimped portion of the outer container and the containers are divided by cutting between the closure members.

9. A method as claimed in claim 5 wherein both containers are filled simultaneously using two adjacent extrusion machines.

10. A method as claimed in claim 9 wherein the tubular containers are made in a continuous manner from longitudinally folded tape which is continuously folded around the extrusion nozzles and side seamed immediately before filling.

11. The pack of claim 1 wherein the resin in the outer container is an unsaturated polyester type resin and a cross-linking agent, and the hardener in the inner container comprises a polymerizing catalyst.

12. The pack of claim 11 wherein the resin is a mixture of maleic acid and adipic acid esterified with ethylene glycol, the cross-linking agent is styrene and the catalyst is an organic peroxide.

* * * * *